United States Patent
Laurenti et al.

(10) Patent No.: US 6,826,679 B1
(45) Date of Patent: Nov. 30, 2004

(54) PROCESSOR WITH POINTER TRACKING TO ELIMINATE REDUNDANT MEMORY FETCHES

(75) Inventors: Gilbert Laurenti, St. Paul de Vence (FR); Vincent Gillet, Le Rouret (FR); Herve Catan, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 566 days.

(21) Appl. No.: 09/716,493

(22) Filed: Nov. 20, 2000

(30) Foreign Application Priority Data

Mar. 10, 2000 (FR) .......................................... 00 400687

(51) Int. Cl.⁷ .............................................. G06F 12/02
(52) U.S. Cl. ........................................ 712/225; 712/35
(58) Field of Search ................................ 712/207, 225, 712/227, 228, 35; 711/123

(56) References Cited

U.S. PATENT DOCUMENTS

| 4,531,200 | A | * | 7/1985 | Whitley ..................... 711/214 |
| 5,357,618 | A | | 10/1994 | Mirza et al. ................. 395/400 |
| 5,623,615 | A | * | 4/1997 | Salem et al. ................. 712/238 |
| 5,649,137 | A | * | 7/1997 | Favor et al. ................. 712/207 |
| 5,734,913 | A | | 3/1998 | Iwamura et al. ............. 395/750 |
| 5,832,257 | A | * | 11/1998 | Touriguian et al. ......... 712/220 |
| 5,919,256 | A | * | 7/1999 | Widigen et al. ............. 712/218 |
| 5,923,705 | A | * | 7/1999 | Willkie et al. .............. 375/220 |
| 6,505,309 | B1 | * | 1/2003 | Okabayashi et al. ......... 714/35 |

FOREIGN PATENT DOCUMENTS

| EP | 0 723 221 A | | 7/1996 | ............. G06F/9/38 |
| GB | 2200481 A | * | 8/1988 | ........... G06F/12/12 |
| WO | WO 83 04137 A | | 11/1993 | ............ G11C/9/06 |

OTHER PUBLICATIONS

Bergey,Jr.,; *Increased Computer Throughput by Conditioned Memory Data Prefetching*, IBM Technical Disclosure Bulletin, vol. 20, No. 10, Mar. 1978, p. 4103.
*Methods of Specifying Data Prefetching Without Using a Separate Instruction*, IBM Technical Bulletin, US, IBM Corp., NY, vol.. 39, No. 6, Jun. 1, 1995, pp. 355–356.

* cited by examiner

*Primary Examiner*—Eddie Chan
*Assistant Examiner*—Barry O'Brien
(74) *Attorney, Agent, or Firm*—Robert D. Marshall, Jr.; W. James Brady, III; Frederick J. Telecky, Jr.

(57) ABSTRACT

A processor is provided that is a programmable digital signal processor (DSP) with variable instruction length, offering both high code density and easy programming. Architecture and instruction set are optimized for low power consumption and high efficiency execution of DSP algorithms, such as for wireless telephones, as well as pure control tasks. A coefficient data pointer is provided for accessing coefficient data for use in a multiply-accumulate (MAC) unit. Monitoring circuitry determines when the coefficient data pointer is modified (step 1104). When an instruction is executed (step 1102) that requires a coefficient datum from memory in accordance with the coefficient data pointer, a memory access is inhibited (step 1108) if the coefficient data pointer has not been modified since the last time a memory fetch was made in accordance with the coefficient data pointer and the previously fetched coefficient datum is reused. However, if the coefficient data pointer was modified since the last time a memory fetch was made in accordance with the coefficient data pointer, then the required coefficient datum is fetched from memory (step 1106). A shadow register within the MAC unit execution pipeline temporarily saves coefficient data for possible reuse.

16 Claims, 11 Drawing Sheets

| | $t_1$ | $t_2$ | $t_3$ | $t_4$ | $t_5$ | $t_6$ | $t_7$ | $t_8$ | $t_9$ | $t_{10}$ | $t_{11}$ |
|---|---|---|---|---|---|---|---|---|---|---|---|
| | 202 | 204 | 206 | 208 | 210 | 212 | 214 | | | | |
| 302 INST 1 | $PF_1$ | $F_1$ | $D_1$ | $AD_1$ | $AC_1$ | $R_1$ | $E_1$ | | | | |
| 304 INST 2 | | $PF_2$ | $F_2$ | $D_2$ | $AD_2$ | $AC_2$ | $R_2$ | $E_2$ | | | |
| 306 INST 3 | | | $PF_3$ | $F_3$ | $D_3$ | $AD_3$ | $AC_3$ | $R_3$ | $E_3$ | | |
| 308 INST 4 | | | | $PF_4$ | $F_4$ | $D_4$ | $AD_4$ | $AC_4$ | $R_4$ | $E_4$ | |
| 310 INST 5 | | | | | $PF_5$ | $F_5$ | $D_5$ | $AD_5$ | $AC_5$ | $R_5$ | |
| 312 INST 6 | | | | | | $PF_6$ | $F_6$ | $D_6$ | $AD_6$ | $AC_6$ | $R_6$ |
| 314 INST 7 | | | | | | | $PF_7$ | $F_7$ | $D_7$ | $AD_7$ | $AC_7$ |

US 6,826,679 B1

PROCESSOR WITH POINTER TRACKING TO ELIMINATE REDUNDANT MEMORY FETCHES

FIELD OF THE INVENTION

The present invention relates to digital microprocessors, and more particularly to multiplier and multiplier/accumulator circuits for digital microprocessors.

BACKGROUND OF THE INVENTION

Microprocessors are general purpose processors which require high instruction throughputs in order to execute software running thereon, and can have a wide range of processing requirements depending on the particular software applications involved. Many different types of processors are known, of which microprocessors are but one example. For example, Digital Signal Processors (DSPs) are widely used, in particular for specific applications, such as mobile processing applications.

DSPs are typically configured to optimize the performance of the applications concerned and to achieve this they employ more specialized execution units and instruction sets. Typically, a DSP includes a multiply-accumulate (MAC) that performs computations using coefficients fetched from memory or stored in registers.

Particularly in, but not exclusively, applications such as mobile telecommunications applications, it is desirable to provide ever increasing DSP performance while keeping power consumption as low as possible.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of processors, such as for example, but not exclusively, digital signal processors.

In accordance with a first aspect of the invention, there is provided a microprocessor that is a programmable digital signal processor (DSP), offering both high code density and easy programming. Architecture and instruction set are optimized for low power consumption and high efficiency execution of DSP algorithms, such as for wireless telephones, as well as pure control tasks. The microprocessor has a stand alone coefficient data pointer and circuitry for tracking coefficient data pointer modification sequences, such that coefficient fetches from memory are minimized in either a single MAC embodiment or in a dual MAC embodiment, whereby power consumption is reduced.

In accordance with another aspect of the present invention, there is a shadow register to hold coefficient data. Redundant memory accesses for a reused coefficient data value are eliminated, thereby preserving memory bandwidth and eliminating memory conflicts and thereby improving processing speed.

In accordance with another aspect of the present invention, a touch instruction "mar(*CDP)" is provided to flag that a coefficient has been updated from a memory write so that the updated coefficient can be fetched for use by the MAC.

In accordance with another aspect of the present invention, an override mechanism is provided to disable the power saving scheme for debug purposes.

In accordance with another aspect of the present invention, coefficient data pointer modification tracking circuitry is simplified by only tracking pointer modification during looping operations.

In accordance with another aspect of the present invention, a method of operating a digital system comprising a microprocessor is provided that includes the steps of: loading a data pointer with an address value; executing a first instruction that requires at least an operand from memory in accordance with the data pointer by fetching the operand from memory in accordance with the address value; and repeating the first instruction or executing a second instruction that requires at least an operand from memory in accordance with the data pointer by inhibiting refetching of the operand from memory if the data pointer has not been modified since the step of executing the first instruction.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the processor of FIG. 1, unless otherwise stated, and in which.

DESCRIPTION OF PARTICULAR EMBODIMENTS

Although the invention finds particular application to Digital Signal Processors (DSPs), implemented, for example, in an Application Specific Integrated Circuit (ASIC), it also finds application to other forms of processors.

The basic architecture of an example of a processor, or microprocessor according to the invention will now be described. Processor 100 is a programmable fixed point DSP core with variable instruction length (8 bits to 48 bits) offering both high code density and easy programming. Architecture and instruction set are optimized for low power consumption and high efficiency execution of DSP algorithms as well as pure control tasks, such as for wireless telephones, for example. Processor 100 includes emulation and code debugging facilities.

Figure 1:
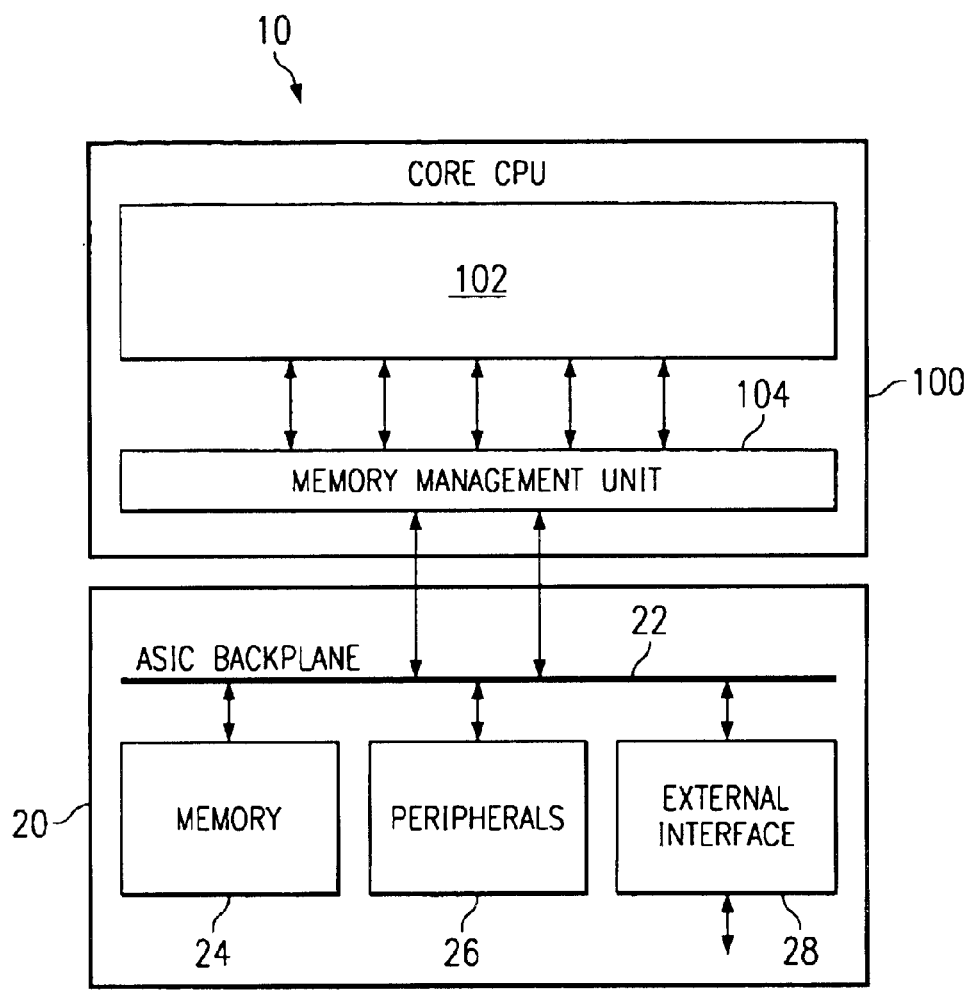
FIG. 1 is a schematic block diagram of a digital system which includes a microprocessor in accordance with an embodiment of the invention.

FIG. 1 is a schematic overview of a digital system 10 in accordance with an embodiment of the present invention. The digital system includes a processor 100 and a processor backplane 20. In a particular example of the invention, the digital system is a Digital Signal Processor System 10 implemented in an Application Specific Integrated Circuit (ASIC). In the interest of clarity, FIG. 1 only shows those portions of processor 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of processor 100 relevant to an embodiment of the present invention are explained in sufficient detail herein below, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such. A representation of a telecommunications device incorporating an embodiment of the present invention will be described later with reference to FIG. 14A and FIG. 14B.

A description of various architectural features and a description of a complete set of instructions of the microprocessor of FIG. 1 is provided in co-assigned application Serial No. 09/410,977, now U.S. Pat. No. 6,658,578, which is incorporated herein by reference.

As shown in FIG. 1, processor 100 forms a central processing unit (CPU) with a processor core 102 and a memory management unit 104 for interfacing the processor core 102 with memory units external to the processor core 102.

Processor backplane 20 comprises ASIC backplane 22, which is a bus to which the memory management unit 104 of the processor is connected. Also corrected to the ASIC backplane 22 is an instruction memory 24, peripheral devices 26 and an external interface 28.

It will be appreciated that in other examples, the invention could be implemented using different configurations and/or different technologies. For example, processor 100 could form a first integrated circuit, with the processor backplane 20 being separate therefrom. Processor 100 could, for example be a DSP separate from and mounted on a backplane 20 supporting a backplane bus 22, peripheral and external interfaces. The processor 100 could, for example, be a microprocessor rather than a DSP and could be implemented in technologies other than ASIC technology. The processor or a processor including the processor could be implemented in one or more integrated circuits.

Figure 2:
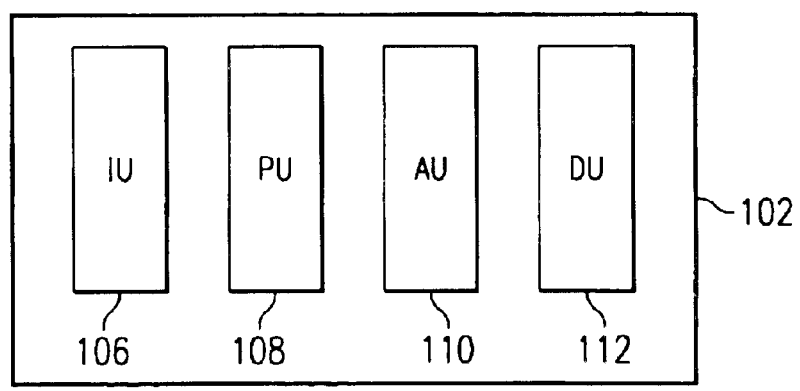
FIG. 2 is a schematic diagram of the processor core of FIG. 1.

FIG. 2 illustrates the basic structure of an embodiment of the processor core 102. As illustrated, this embodiment of the processor core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
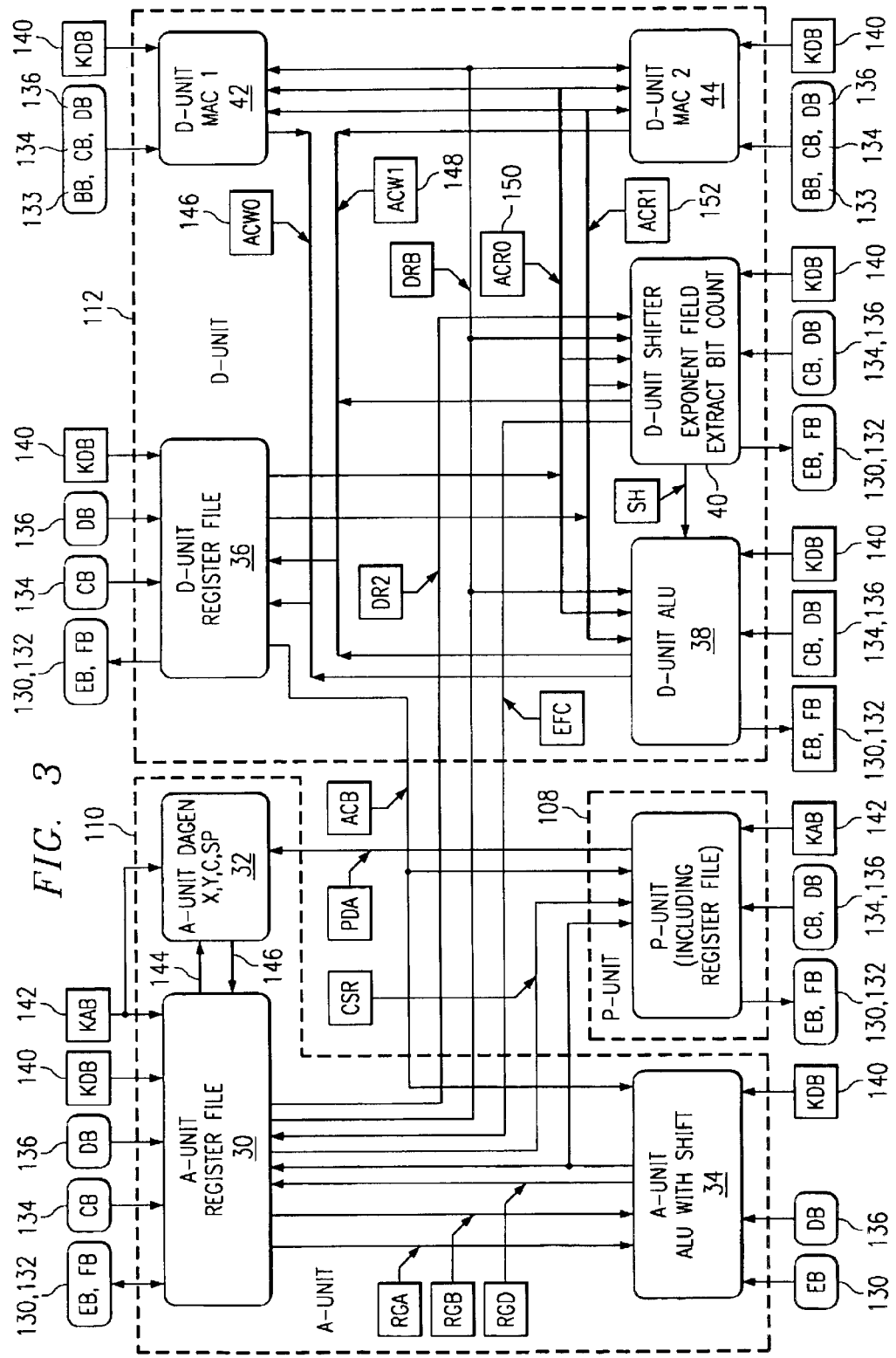
FIG. 3 is a more detailed schematic block diagram of various execution units of the processor core.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose buses (EB,DB) 130,136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by buses RGA and RGB for receiving address and data register contents and by a bus RGD for forwarding address and data registers in the register file 30.

In accordance with the illustrated embodiment of the invention, D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to buses (EB, FB, CB, DB and KDB) 130, 132, 134, 136 and 140, and the MAC units 42 and 44 are coupled to the buses (CB, DB, KDB) 134, 136, 140 and Data Read bus (BB) 133. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write buses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read buses (ACR0, ACR1) 150, 152. The D Unit ALU 38 and D Unit shifter 40 are also coupled to sub-units of the A Unit 108 via various buses labeled EFC, DRB, DR2 and ACB.

Figure 4:
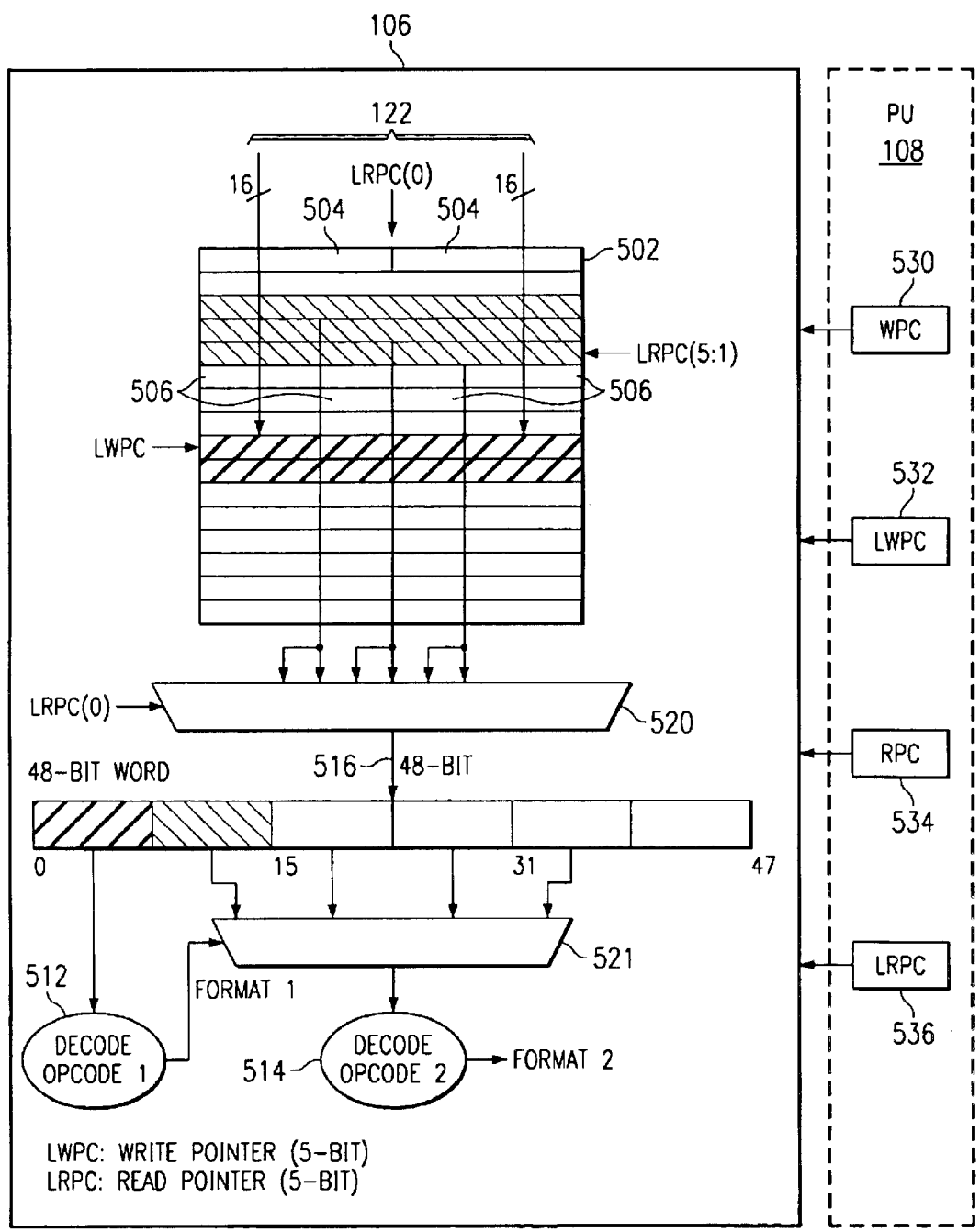
FIG. 4 is a schematic diagram of an instruction buffer queue and an instruction decoder of the processor.

Referring now to FIG. 4, there is illustrated an instruction buffer unit 106 in accordance with the present embodiment, comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 lw of the next instruction or instructions to be loaded into the instruction decoder/s 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder/s 512/514.

In this embodiment, the instructions are formed into a 48 bit word and are loaded into the instruction decoders 512, 514 over a 48 bit bus 516 via multiplexers 520 and 521. It will be apparent to a person of ordinary skill in the art that the instructions may be formed into words comprising other than 48-bits, and that the present invention is not to be limited to the specific embodiment described above.

For presently preferred 48-bit word size, bus 516 can load a maximum of 2 instructions, one per decoder, during any one instruction cycle for parallel execution. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decode thereof. The multiplexing associated with the alignment of instructions with byte boundaries is performed in multiplexors 520 and 521.

Two instructions can be put in parallel if one of the two instructions is provided with a parallel enable bit. The hardware support for such type of parallelism is called the parallel enable mechanism. Likewise, two instructions can be put in parallel if both of the instructions make single data memory accesses (Smem, or dbl(lmem)) in indirect mode. The, hardware support for such type of parallelism is called the soft dual mechanism.

Processor core 102 executes instructions through a 7 stage pipeline, the respective stages of which will now be described with reference to Table 1 and to FIG. 5. The processor instructions are executed through a seven stage pipeline regardless of where the execution takes place (A unit or D unit). In order to reduce program code size, a C compiler, according to one aspect of the present invention, dispatches as many instructions as possible for execution in the A unit, so that the D unit can be switched off to conserve power. This requires the A unit to support basic operations performed on memory operands.

TABLE 1

Processor Pipeline Operation for a
Single Cycle Instruction With No Memory Wait States

| Pipeline stage | Description. |
| --- | --- |
| P0 Pre-Fetch | Address program memory via the program address bus PAB. |
| P1 Fetch | Read program memory through the program bus PB. Fill instruction buffer queue with the 4 bytes fetched in program memory. |
| P2 Decode | Read instruction buffer queue (6 bytes) Decode instruction pair or single instruction. Dispatch instructions on Program Flow Unit (PU), Address Data Flow Unit (AU), and Data Computation Unit (DU). |
| P3 Address | Data address computation performed in the 3 address generators located in AU: Pre-computation of address to be generated in: direct SP/DP relative addressing mode. indirect addressing mode via pointer registers. Post-computation on pointer registers in: indirect addressing mode via pointer registers. Program address computation for PC relative branching instructions: goto, call, switch. |
| P4 Access | Read memory operand address generation on BAB, CAB, DAB buses. Read memory operand on CB bus (Ymem operand). |
| P5 Read | Read memory operand on DB (Smem, Xmem operand), on CB and DB buses (Lmem operand), on BB (coeff operand) Write memory operand address generation on EAB and FAB buses. |
| P6 Execute | Execute phase of data processing instructions executed in A unit and D unit. Write on FB bus (Ymem operand). Write Memory operand on EB (Smem, Xmem operand), on EB and FB buses (Lmem operand). |

The first stage of the pipeline is a PRE-FETCH(P0) stage 202, during which stage a next program memory location is addressed by asserting an address on the address bus (PAB) 118 of a memory interface 104.

In the next stage, FETCH(P1) stage 204, the program memory is read and the I Unit 106 is filled via the PB bus 122 from the memory interface unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS(P3) stage 208, in which the address of the data to be used in the instruction is computed, or a new program address is computed should the instruction require a program branch or jump. Respective computations take place in A Unit 110 or P Unit 108 respectively.

In an ACCESS(P4) stage 210, the address of a read operand is generated and the memory operand, the address of which has been generated in a DAGEN Y operator with a Ymem indirect addressing mode, is then READ from indirectly addressed Y memory (Ymem).

The next stage of the pipeline is the READ (P5) stage 212 in which a memory operand, the address of which has been generated in a DAGEN X operator with an Xmem indirect addressing mode or in a DAGEN C operator with coefficient address mode, is READ. The address of the memory location to which the result of the instruction is to be written is generated.

Finally, there is an execution EXEC (P6) stage 214 in which the instruction is executed in either the A Unit 110 or the D Unit 112. The result is then stored in a data register or accumulator, or written to memory for Read/Modify/Write instructions. Additionally, shift operations are performed on data in accumulators during the EXEC stage.

Processor 100's pipeline is protected. This significantly improves the C compiler performance since no NOP's instructions have to be inserted to meet latency requirements. It also makes the code translation from a prior generation processor to a latter generation processor much easier.

A pipeline protection basic rule used in processor 100 is as follows: if a write access has been initiated before the on going read access but not yet completed and if both accesses share the same resource then extra cycles are inserted to allow the write completion and execute next instruction with the updated operands; but for emulation, a single step code execution must behave exactly as free running code execution.

The basic principle of operation for a pipeline processor will now be described with reference to FIG. 5. As can be seen from FIG. 5, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 5 for a seven stage pipeline a total of 7 instructions may be processed simultaneously. For all 7 instructions 302–314, FIG. 5 shows them all under process in time period $T_7$. Such a structure adds a form of parallelism to the processing of instructions.

Figure 6:
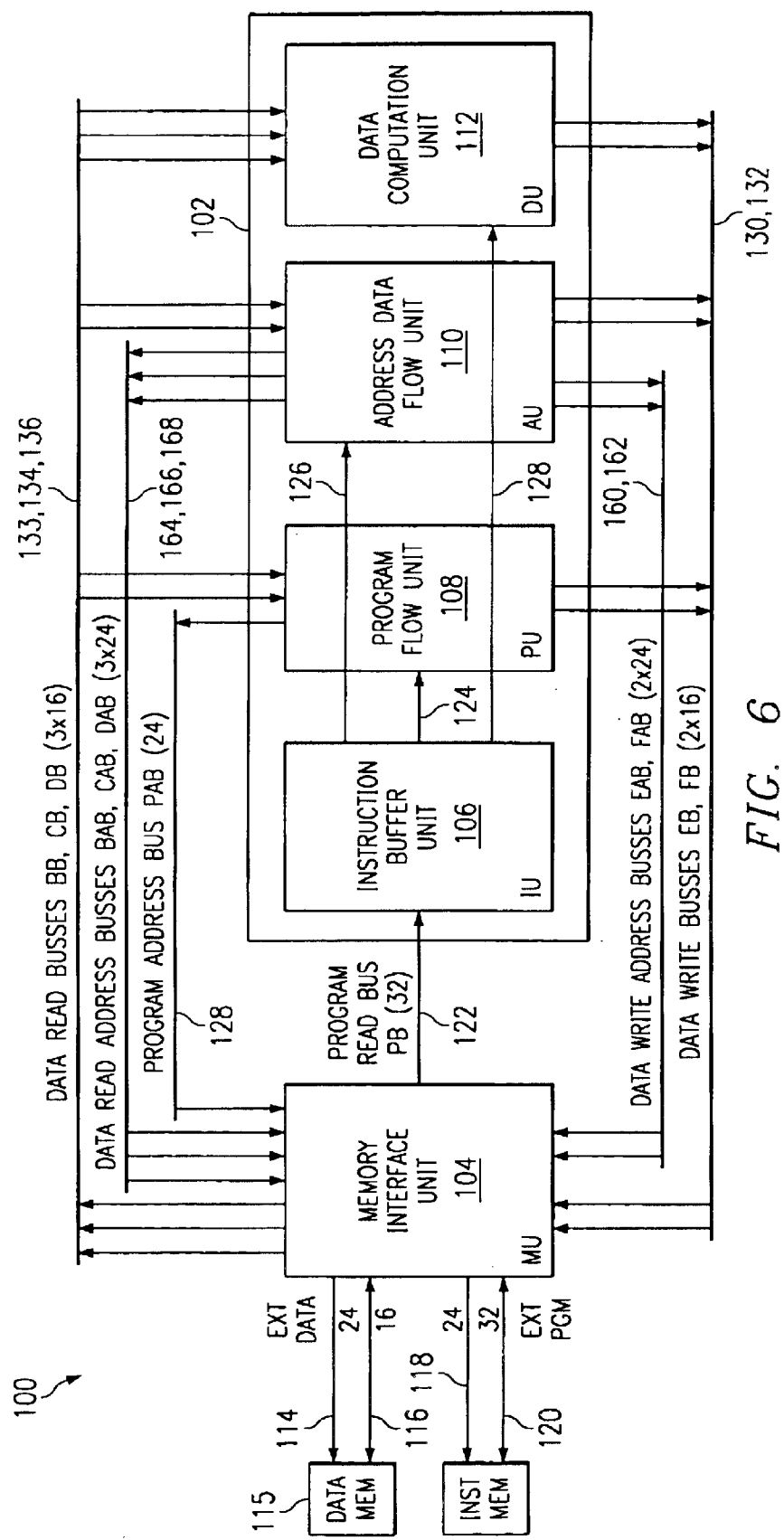
FIG. 6 is a block diagram of the processor illustrating a memory management unit and interconnected memory.

As shown in FIG. 6, the present embodiment of the invention includes a memory interface unit 104 which is coupled to external program storage memory 150 via a 24 bit address bus 118 and a 32 bit bi-directional data bus 120. Additionally, the memory interface unit 104 is coupled to data memory units 151 via a 24 bit address bus 114 and a bi-directional 16 bit data bus 116. The memory interface unit 104 is also coupled to the I Unit 106 of the machine processor core 102 via a 32 bit program read bus (PB) 122. The P Unit 108, A Unit 110 and D Unit 112 are coupled to the memory interface unit 104 via data read and data write buses and corresponding address buses. The P Unit 108 is further coupled to a program address bus 128.

More particularly, the P Unit 108 is coupled to the memory interface unit 104 by a 24 bit program address bus 128, the two 16 bit data write buses (EB, FB) 130, 132, and the two 16 bit data read buses (CB, DB) 134, 136. The A Unit 110 is coupled to the memory interface unit 104 via two 24 bit data write address buses (EAB, FAB) 160, 162, the two 16 bit data write buses (EB, FB) 130, 132, the three data read address buses (BAB, CAB, DAB) 164, 166, 168 and the two 16 bit data read buses (CB, DB) 134, 136. The D Unit 112 is coupled to the memory interface unit 104 via the two data write buses (EB, FB) 130, 132 and three data read buses (BB, CB, DB) 133, 134, 136.

FIG. 6 represents the passing of instructions from the I Unit 106 to the P Unit 108 at 124, for forwarding branch instructions for example. Additionally, FIG. 6 represents the passing of data from the I Unit 106 to the A Unit 110 and the D Unit 112 at 126 and 128 respectively.

Figures 5, 7:
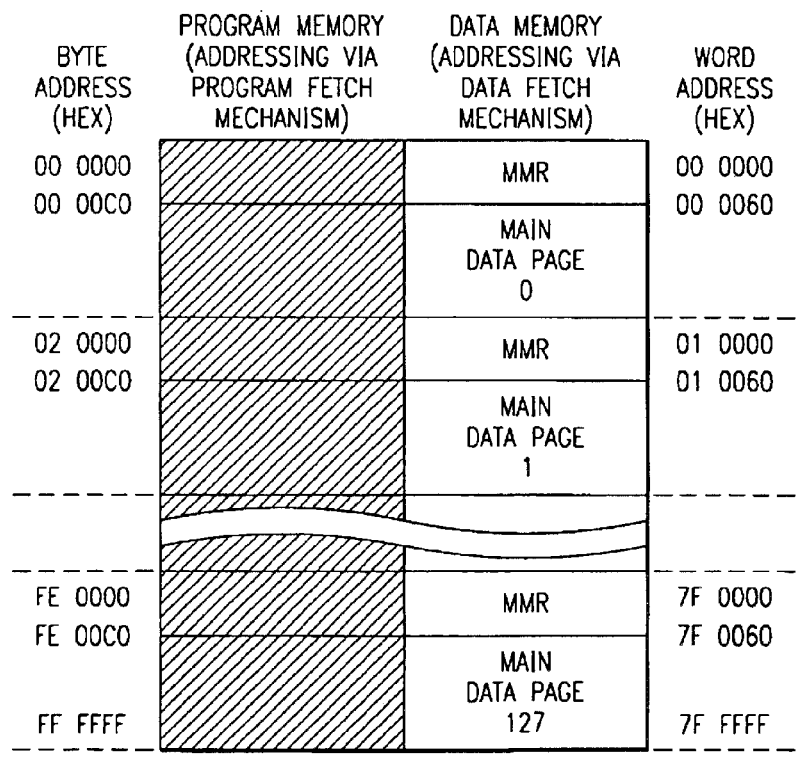
FIG. 5 is a schematic representation of the processor core for explaining the operation of the pipeline of the processor.
FIG. 7 shows the unified structure of Program and Data memory spaces of the processor.

Processor 100 is organized around a unified program/data space, as illustrated in FIG. 7. A program pointer is internally 24 bits and has byte addressing capability, but only a 22 bit address is exported to memory since program fetch is always performed on a 32 bit boundary. However, during emulation for software development, for example, the full 24 bit address is provided for hardware breakpoint implementation. Data pointers are 16 bit extended by a 7 bit main data page and have word addressing capability.

Software can define up to 3 main data pages, as follows:

| MDP | Direct access | Indirect access | CDP |
|---|---|---|---|
| MDP05 | — | Indirect access | AR [0–5] |
| MDP67 | — | Indirect access | AR [6–7] |

A stack is maintained and always resides on main data page 0. CPU memory mapped registers are visible from all the pages.

Various aspects of processor 100 are summarized in Table 2. An integrated circuit in which processor is packaged includes a plurality of contacts for surface mounting. However, the integrated circuit could include other configurations, for example a plurality of pins on a lower surface of the circuit for mounting in a zero insertion force socket, or indeed any other suitable configuration.

TABLE 2

Summary of Improved Processor 100

Very Low Power programmable processor
Parallel execution of instructions, 8-bit to 48-bit instruction format
Seven stage pipeline (including pre-fetch)
Instruction buffer unit highlight   32x16 buffer size
   Parallel Instruction dispatching
   Local Loop

TABLE 2-continued

Summary of Improved Processor 100

| | |
|---|---|
| Data computation unit highlight | Four 40 bit generic (accumulator) registers |
| | Single cycle 17x17 Multiplication-Accumulation (MAC) 40 bit ALU, "32 + 8" or "(2 × 16) + 8" |
| | Special processing hardware for Viterbi functions |
| | Barrel shifter |
| Program flow unit highlight | 32 bits/cycle program fetch bandwidth |
| | 24 bit program address |
| | Hardware loop controllers (zero overhead loops) |
| | Interruptible repeat loop function |
| | Bit field test for conditional jump |
| | Reduced overhead for program flow control |
| Data flow unit highlight | Three address generators, with new addressing modes |
| | Three 7 bit main data page registers |
| | Two Index registers |
| | Eight 16 bit pointers |
| | Dedicated 16 bit coefficients pointer |
| | Four 16 bit generic registers |
| | Three independent circular buffers |
| | Pointers & registers swap |
| | 16 bits ALU with shift |
| Memory Interface highlight | Three 16 bit operands per cycle |
| | 32 bit program fetch per cycle |
| | Easy interface with cache memories |
| C compiler | |
| Algebraic assembler | |

Aspects of the multiplier circuits will now be described in more detail. Details of general construction of multiply-accumulate (MAC) units are well known, and may be found readily elsewhere. A detailed description of the dual MAC units of the present embodiment is found in coassigned U.S. patent application Ser. No. 09/411,167 entitled "Improved Multiplier Accumulator Circuits" and is incorporated herein by reference.

Single MAC

Figure 8:
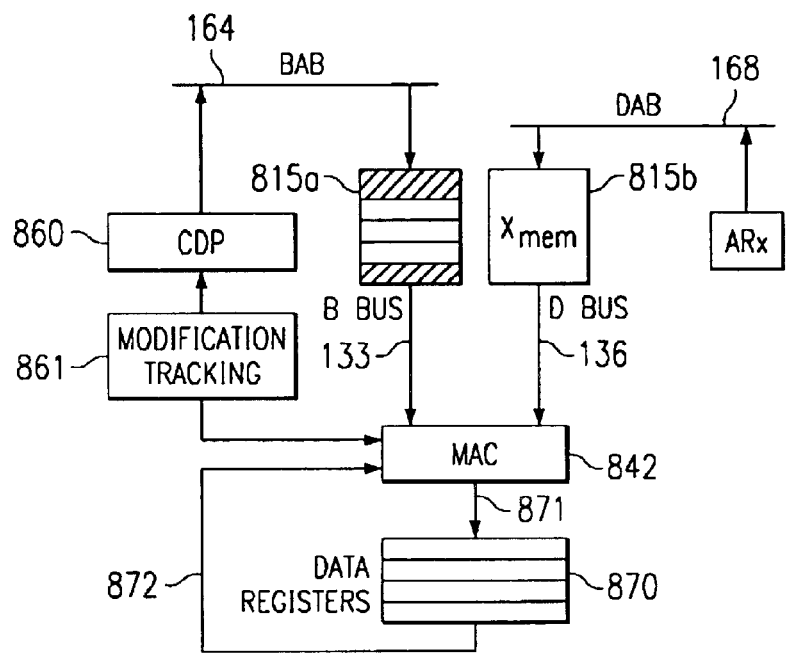
FIG. 8 is a simplified block diagram depicting bus, memory and register utilization by a MAC unit in an embodiment of the present invention and having a coefficient data pointer for requesting coefficient data from memory.

FIG. 8 is a simplified block diagram depicting bus, memory and register utilization by a MAC unit 842 in an embodiment of the present invention and having a coefficient data pointer for requesting coefficient data from memory. Multiply and accumulate unit 842 is similar to MAC unit 42 of FIG. 3 and preferably performs its task in one CPU clock cycle. The input operands use a 17-bit signed representation while accumulation is for 40 bits. Arithmetic modes, exceptions and status flags are also handled. Saturation mode selection can be also defined dynamically in the multiply instruction.

| Possible sources of operands are defined below: | | |
|---|---|---|
| from memory: | 2 | 16-bit data from RAM, |
| | 1 | 16-bit data from "coefficient" RAM, |
| from internal Data registers: | 2 | 17-bit data from high part (bits 32 to 16) of register, |
| | 1 | 40-bit data for accumulation, |
| from instruction decode: | 1 | 16-bit "immediate" value, |
| from other 16-bit registers: | 1 | 16-bit data. |

Coefficient and data delivery use the B and D busses as shown in FIG. 8. Data coming from memory bank 815b are transferred via D bus 136. In order to allow automatic addressing of coefficients without sacrificing a pointer, a dedicated bus is provided and called B bus 133. The B bus is associated with a selected memory bank 815a. This bank is used as a "dynamic" storage area for coefficients. Memory banks 815a and 815b are both included within memory 115 of FIG. 3.

Access to the B bus is supported in parallel with a Single, Dual or Long access to other parts of the memory space and only with a Single access to the associated memory bank. An addressing mode to deliver the B value uses a base address (16 bits) stored in a standalone coefficient data pointer (CDP) 860 and an incrementor to scan a coefficient table in memory bank 815a. This pointer is managed separately and can be incremented, decremented, or signed index post incremented to fetch data, typically "coefficients."

Referring still to FIG. 8, the output of the MAC unit is passed to a register in a register file 870 (preferably an accumulator) via bus 871 and the register value is supplied to the MAC via bus 872.

CDP modification tracking circuitry 861 monitors CDP 860 to determine a current modification state. The operation of modification tracking circuitry 861 will be described in more detail with reference to FIGS. 10, 11A and 11B.

Dual MAC

Figure 9:
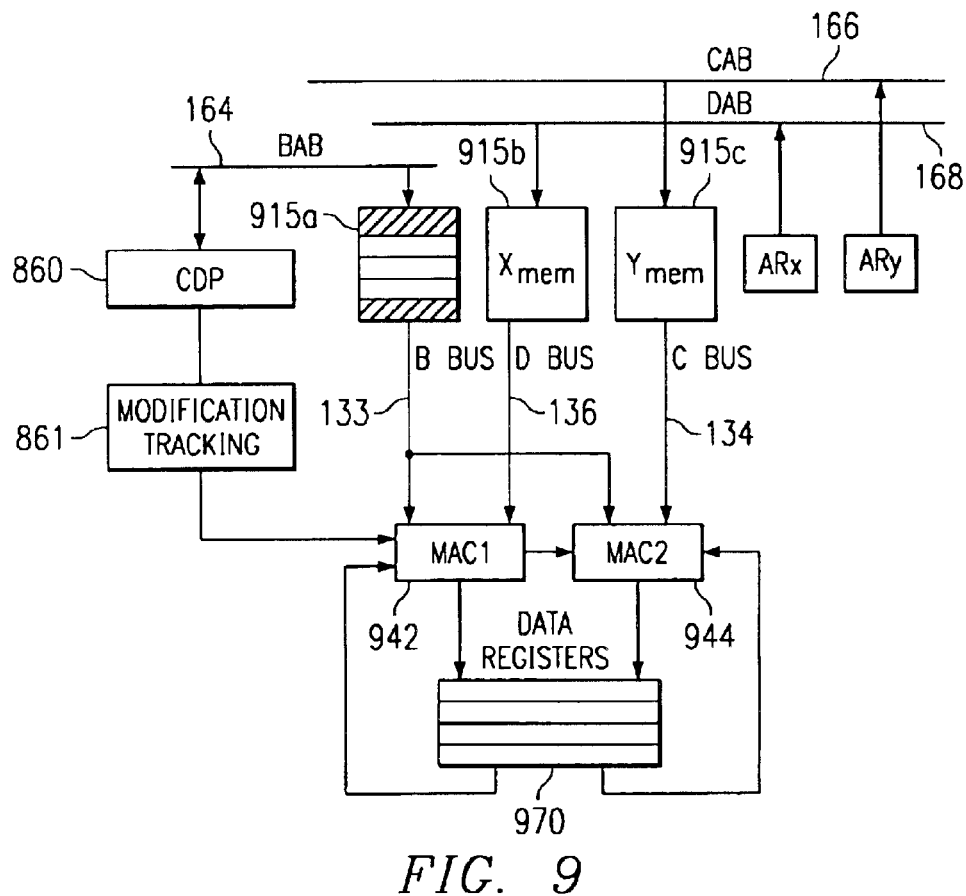
FIG. 9 is a simplified block diagram depicting bus, memory and register utilization by a dual MAC unit in an alternative embodiment of the present invention and having a coefficient data pointer for requesting coefficient data from memory.

FIG. 9 is a simplified block diagram depicting bus, memory and register utilization by a dual MAC unit in an alternative embodiment of the present invention and having a coefficient data pointer 860 for requesting coefficient data from memory. More particularly, it may be seen that a first RAM bank 915a supplies a first operand to both MAC units 942, 944. A second RAM bank 915b supplies a second operand to MAC 942 via bus D 136. Similarly, a third RAM bank 915c supplies a second operand to the second MAC unit 944 via C bus 134. Both MACs provide outputs to registers file 970 (preferably accumulators) via respective output busses and receive inputs from the registers via respective input busses.

CDP modification tracking circuitry 861 monitors CDP 860 to determine a current modification state. The operation of modification tracking circuitry 861 will be described in more detail with reference to FIGS. 10, 11A and 11B.

Control of the second MAC is performed via an instruction class "Dual MAC", which allows combinations of operations MPY/MAC/MAS on the two operators and the decoding of which generates necessary control signals for gating the execution clock of the second MAC.

In terms of throughput, the most efficient usage of the dual MAC execution requires a sustained delivery of three operands per cycle, as well as two accumulator contents, for DSP algorithms. Not breaking the whole busses architecture while still offering an increase in computation power, the B bus system gives the best flexibility to match this throughput requirement. Thus, the "coefficient" bus 133 and its associated memory bank 915a are provided. Advantageously, sharing the coefficient bus and its associated memory bank reduces power consumption over a system with a replicated coefficient structure. Likewise, power saving can be realized by storing MAC coefficients in the data registers (DRx) 970 which are shared between MAC1 and MAC2.

Advantageously, by monitoring the modification state of CDP 860, redundant coefficient accesses to memory bank 915a can be inhibited and significant power savings can be realized without needing to use one of data registers 970 to store a coefficient.

Addressing

Figure 10:
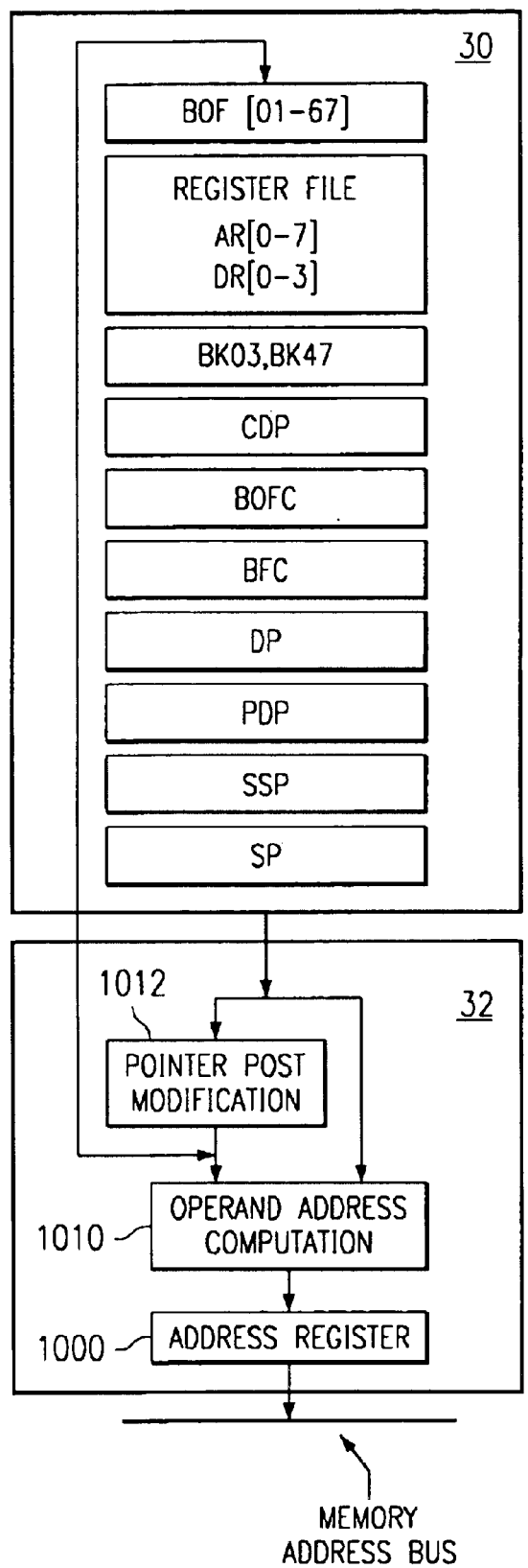
FIG. 10 is a block diagram of a portion of the data address generation unit of the processor, illustrating various address registers including the coefficient data pointer of FIG. 8 and FIG. 9.

FIG. 10 is a block diagram of a portion of the data address generation unit 32 of processor 100, illustrating various address: registers including the coefficient data pointer 860 of FIG. 8 and FIG. 9. A-unit register file 30 includes a number of memory mapped registers, including: circular buffer offset registers BOF01, BOF23, BOF45, and BOF67, address register AR(0–7), data registers DR(0–7), circular buffer size registers BK03, BK47, coefficient data pointer CDP, coefficient circular buffer offset register BOFC, local data page register DP, peripheral data page register PDP, system stack pointer SSP, and stack pointer SP.

Data address generation unit (DAGEN) 32 forms an address in operand address computation circuitry 1010 by combining a data pointer, such as coefficient data pointer CDP and a data page register DP and placing the complete address in address register 1000. Address register 1000 is representative of several such address registers that are each associated with the various read and write data address buses BAB, CAB, DAB, EAB, and FAB. Coefficient data pointer CDP, or any of the address pointers, can be post modified by pointer post modification circuitry 1012 after a complete address is loaded into address register 1000.

Coefficient Data Memory Addressing (Coeff)

The processor architecture supports a class of instructions similar to dual MAC operands which involve the fetch of three memory operands per cycle. Two of these operands can be addressed as dual memory access; the third one is usually the coefficient and resides on a separate physical memory bank. A specific pointer is dedicated to coefficients addressing. Table 3 summarizes the CDP modifiers supported by the address generation unit.

TABLE 3

CDP Modifiers

| Mod | Notation | Operation |
|---|---|---|
| 00 | coeff(*CDP) | No modification |
| 01 | coeff(*CDP+) | Post increment |
| 10 | coeff(*CDP−) | Post decrement |
| 11 | coeff(*CDP + DR0) | DR0 index post increment |

Coefficient data memory addressing allows memory read accesses through the coefficient data pointer register CDP. This mode has the same properties as indirect single data memory addressing mode. Indirect memory addressing accesses through the CDP pointer register are performed within the main data page selected by the MDP register. Indirect memory addressing accesses through the CDP address registers can address circular memory buffers.

Instructions using the coefficient memory addressing mode to access a memory operand mainly perform operations with three memory operands per cycle. Two of these operands, Xmem and Ymem, can be accessed with the indirect dual data memory addressing modes. The third operand is accessed with the coefficient data memory addressing mode. This mode is designated in the instruction with a coeff keyword.

The following instruction example illustrates this addressing scheme. In one cycle, two multiplications can be performed in parallel in the D-unit dual MAC operator. One memory operand is common to both multipliers (coeff), while: indirect dual data memory addressing accesses the two other data (Xmem and Ymem).

ACx=sat40(rnd(uns(Xmem)* uns(coeff))), sat40(rnd(uns(Ymem)* uns(coeff)))

Coeff operands are accessed through the B bus. To access three read memory operands (as in the above example) in one cycle, the coeff operand is located in a different memory bank than the Xmem and Ymem operands. Table 4 summarizes the modifier options supported by the processor architecture for coefficient memory accesses.

TABLE 4 coeff Coefficient Data Memory Addressing Modifiers

| Assembly Syntax | Generated Address | Ponter Register Modification | Access Type |
|---|---|---|---|
| coeff(*CDP) | MDP · ([BOFC +]CDP) | No modification | |
| coeff(*CDP+) | MDP · ([BOFC +]CDP) | CDP = CDP + 1 | Coeff |
| | | CDP = CDP + 2 | Dbl(coeff) |
| coeff(*CDP−) | MDP · ([BOFC +]CDP) | CDP = CDP − 1 | Coeff |
| | | CDP = CDP − 2 | Dbl(coeff) |
| coeff(*CDP + DR0)) | MDP · ([BOFC +]CDP) | CDP = CDP + DR0 | |

Note: This symbol indicates a concatenation operation between a 7-bit field and a 16 bit field: *
Note: Buffer offset BOFC is only added when circular addressing mode is activated.

Referring again to FIG. 8 and FIG. 9, modification tracking circuit 861 monitors coefficient data pointer (CDP) and takes note of any post modification performed by post modification circuit 1012.

Figure 11A:
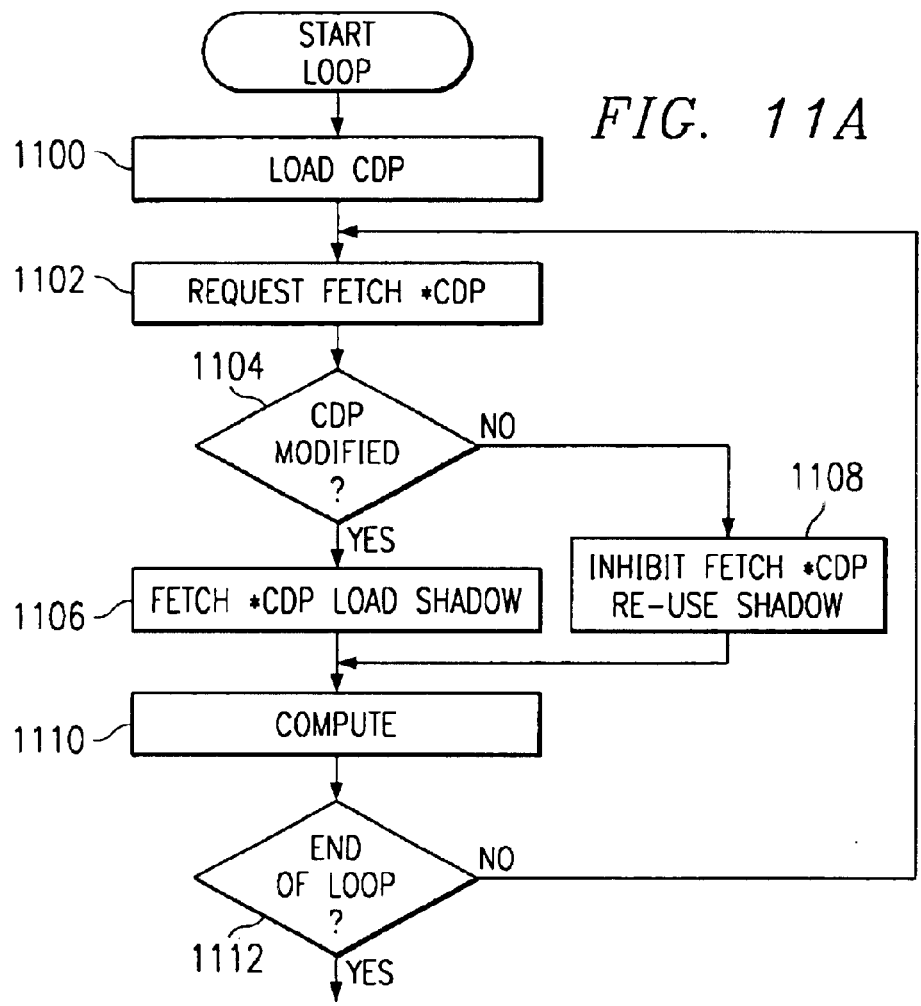
FIG. 11A is a flow chart illustrating a method for eliminating redundant memory accesses according to an embodiment of the present invention.

FIG. 11A is a flow chart illustrating a method for eliminating redundant memory accesses during an instruction loop according to an embodiment of the present invention. Advantageously, by eliminating redundant coefficient fetches during the execution of an instruction loop, power consumption within processor 100 is reduced.

In step, 1100, the CDP is loaded. Since the CDP is a memory mapped register, loading of the CDP can be performed by a memory write instruction, for example.

In step 1102, an instruction is executed by processor 100 that requests an indirect memory access through the CDP, such as the dual multiplication example above.

In step 1104 a decision is made regarding the modification status of the CDP. If the CDP has been modified since the last time an indirect memory access through the CDP was requested, then step 1106 is performed, otherwise step 1108 is performed. If the CDP is post modified during an immediately previous indirect memory access, then step 1106 is performed. This decision is based on the state of a state machine that is described in moredetail with reference to FIG. 11B.

Figure 12:
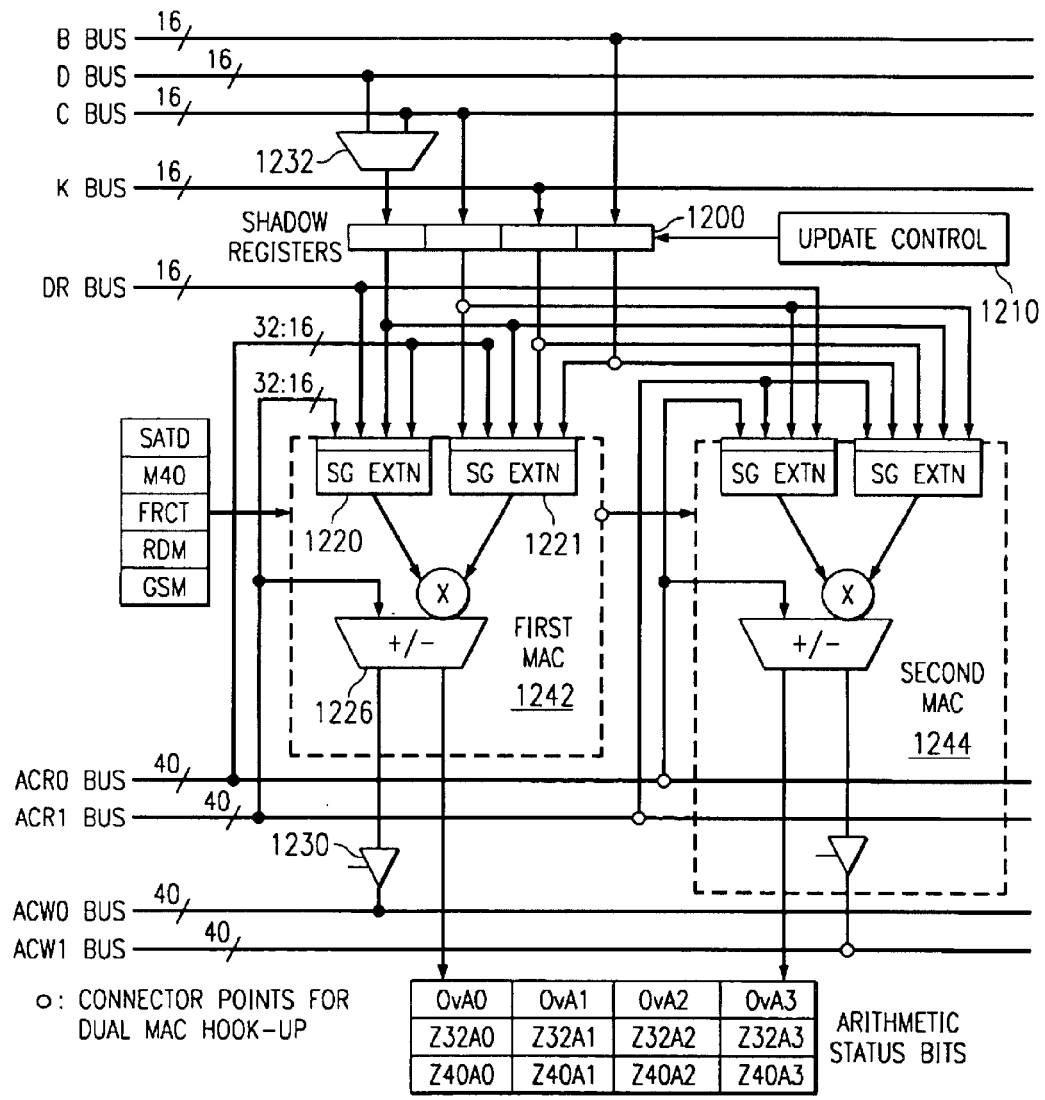
FIG. 12 depicts a simplified block diagram of a MAC unit in an embodiment of the present invention interconnected with various busses for data sources and data destinations and further illustrating shadow registers that temporarily hold operands and coefficients.
Figure 13:
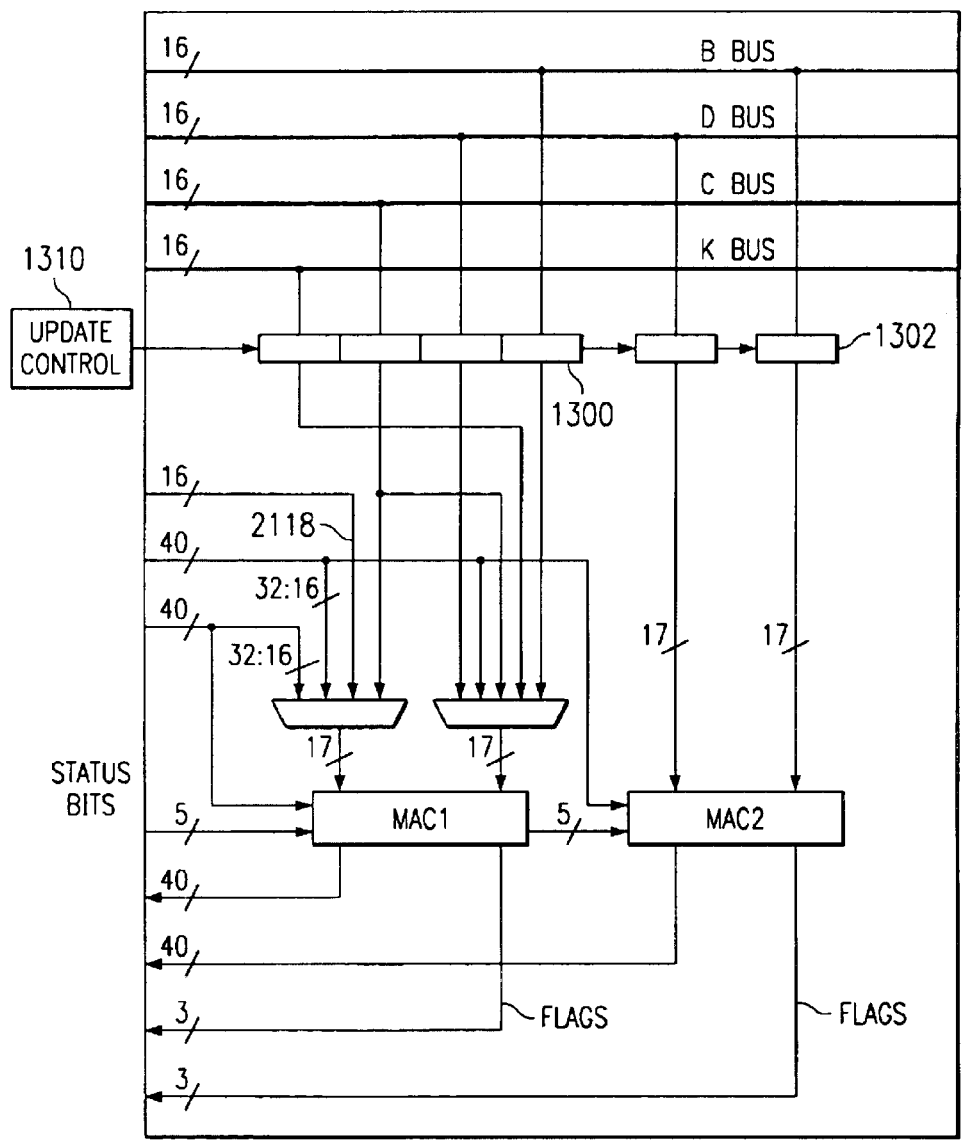
FIG. 13 depicts a simplified block diagram depicting bus interconnections and shadow registers for a dual MAC arrangement in an alternative embodiment of the present invention.

In step 1106 an operand is fetched from memory using an indirect memory access through the CDP. The operand is provided to either the single MAC unit of FIG. 8 or to both MAC units of FIG. 9 via B Bus 133. A shadow register, which is shown in FIG. 12 and FIG. 13, forms a portion of the instruction execution pipeline and receives the operand at the end of the fetch cycle.

Step 1108 is performed if the CDP had not been modified since the last indirect memory access through the CDP. In this case, the operand that was stored in the shadow register during a previous step 1106 is reused.

During step 1110, a computation is performed using the operand that is stored in the shadow register. The computation performed in this step is in response to the instruction that requested the indirect memory access through the CDP during step 1102, such as the dual multiply example above.

Step 1112 determines if the loop is complete. If not, steps 1102, 1104, 1106 or 1108, and 1110 are repeated.

Figure 11B:
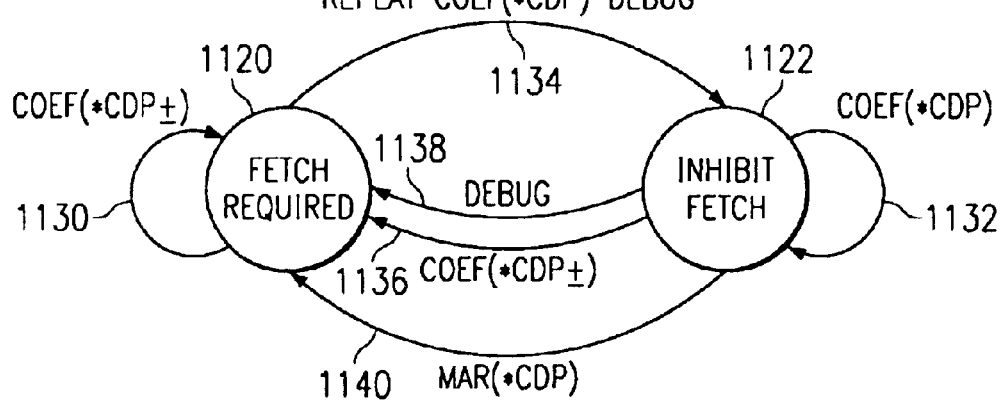
FIG. 11B is a state diagram for a state machine to track modification sequences to the coefficient data pointer of FIG. 10 that is used to control the flow of FIG. 11A.

FIG. 11B is a state diagram for a state machine to track modification sequences to the coefficient data pointer of FIG. 10 that is used to control the flow of FIG. 11A in step 1104. In state 1120, a fetch is required because the CDP has been modified since the last time an indirect memory access through the CDP was performed. In state 1122, the CDP hask not been modified since the last time an indirect memory access through the CDP was performed and a redundant fetch is inhibited.

While in modified state 1120, whenever an indirect memory access through the CDP is performed a fetch is required and step 1106 is performed. If the CDP is post modified, then modified state 1120 is maintained, as indicated by arc 1130.

While in inhibit fetch state 1122, whenever an indirect memory access through the CDP is requested step 1108 is performed and the redundant coefficient fetch is inhibited. As long as the CDP is not post modified, inhibit fetch state 1122 is maintained, as indicated by arc 1132.

Inhibit fetch state 1122 is entered whenever an indirect memory access through the CDP is performed during a repeat or loop instruction sequence if post modification of the CDP is not requested and the processor is not in debug mode, as indicated by arc 1134.

Inhibit fetch state 1122 is exited whenever an indirect memory access through the CDP is performed with post modification of the CDP, as indicated by arc 1136.

Inhibit fetch state 1122 is exited whenever debug mode is entered, as indicated by arc 1138. Debug mode is indicated by setting a bit in a status register of processor 100. This bit can be set by writing to the memory mapped status register.

Inhibit fetch state 1122 is exited whenever a mar(*CDP) instruction is executed, as indicated by arc 1140. A "mar" instruction is "modify address register" and is interpreted as a "touch" instruction to indicate that inhibit state 1122 should be exited. This is useful for a case in which the CDP has not been modified, but the data at the associated memory location has been modified, such as by a memory write. In this case, a fetch of the new coefficient data is required, even though the CDP has not been modified.

Referring now to FIG. 12, there may be seen a simplified block diagram of a first MAC unit 1242 of the present invention interconnected with various busses for data sources and data destinations. There may also be seen a second MAC unit 1244 interconnected with the same bus structure. As may be seen from FIG. 12, the two operands for the first MAC unit may come from a plurality of sources including busses B, D, C, K, DR, ACR0, and ACR1, ACR0 and ACR1 are the read busses for the data registers, which preferably includes the accumulator registers. ACW0 and ACW1 are the write busses for these data registers. The DR bus carries values from a general purpose area of registers. Two input operand multiplexers 1220, 1221 select which bus supplies an operand to the MAC unit. The final result from the MAC unit is provided to ACW0 by tri-statable drivers 1230. It may also be seen that ACR1 supplies a third number to the MAC unit accumulator 1226. There may further be seen the interconnections for input status signals and output flags. Finally, a multiplexer 1232 may be employed to select between bus D or C as one possible input to multiplexer 1220.

As discussed previously, a set of shadow registers are provided to receive data fetched from memory in order to demarcate an instruction execution pipeline stage. Shadow register 1200 receives coefficient data provided in the B Bus. Update control circuitry provides gated clocks to the shadow register so the each shadow register is clocked only when an associated memory fetch is performed. Thus, if a redundant coefficient memory access is requested through the CDP, and the fetch is inhibit by the state machine of FIG. 11B, then update control circuitry 1210 does not assert a clock signal to shadow register 1200 and the prior contents are maintained.

In a similar manner the second MAC unit is interconnected with the bus structure and input status signals and output flags.

The multiplication operations work with 16-bit signed or unsigned data (as operands for the multiplier) and with a 40-bit value from internal registers (registers are accumulator). The result is preferably stored in one of the 40-bit Accumulators. Multiply or multiply/accumulate is under control of FRACT, SATD and Round mode control signals. Multiply or multiply/accumulate is also affected by the GSM mode which generates a saturation to "00 7FFF FFFF" (hexa) of the final result when the two multiply operands are both equal to $-2^{15}$ and the FRACT and SATD modes are on.

For sign handling purpose, the multiply operands are actually coded on 17 bits (so the sign is doubled for 16-bit signed data). These operands are always considered signed unless otherwise controlled by an instruction. When the source of these values is an internal register then a signed 17-bit accurate computation is usable. The functional operations available on multiply-and-accumulate circuits of the present embodiment are: MPY—multiply operation, MAC—multiply and add to accumulator content, and MAS—subtract multiply result from the accumulator content.

Table 5 below shows all possible combinations and corresponding operations. The multiply and the "multiply-and-accumulate" operations return two status bits or flags, i.e. Zero and Overflow (OVF) detection.

TABLE 5

MPY, MAC, and MAS Operations

| FRACT | GSM | SATD | RND | MPY | MAC | MAS |
|---|---|---|---|---|---|---|
| on | off | off | off | x*(2*y) | x*(2*y) + a | a − x*(2*y) |
| off | off | off | off | x*y | x*y + a | a − x*y |
| on | on | off | off | x*(2*y) | x*(2*y) + a | a − x*(2*y) |
| off | on | off | off | x*y | x*y + a | a − x*y |
| on | off | on | off | satM40(x*(2*y)) | satM40(x*(2*y) + a) | satM40(a − x*(2*y)) |

TABLE 5-continued

MPY, MAC, and MAS Operations

| FRACT | GSM | SATD | RND | MPY | MAC | MAS |
|---|---|---|---|---|---|---|
| off | off | on | off | satM40(x*y) | satM40(x*y + a) | satM40(a − x*y) |
| on | on | on | off | satM40(x*(2*y))<br>x = y = $2^{18}$:$2^{31}$ − 1 | satM40(x*(2*y) + a)<br>satM40($2^{31}$ − 1 + a) | satM40(a − x*(2y))<br>satM40(a − $2^{31}$ + 1) |
| off | on | on | off | satM40(x*y) | satM40(x*y + a) | satM40(a − x*y) |
| on | off | off | on | mdRDM(x*(2*y)) | mdRDM(x*(2*y) + a) | mdRDM(a − x*(2*y)) |
| off | off | off | on | mdRDM(x*y) | mdRDM(x*y + a) | mdRDM(a − x*y) |
| on | on | off | on | mdRDM(x*(2*y)) | mdRDM(x*(2*y) + a) | mdRDM(a − x*(2*y)) |
| off | on | off | on | mdRDM(x*y) | mdRDM(x*y + a) | mdRDM(a − x*y) |
| on | off | on | on | satM40(mdRDM(x*(2*y))) | satM40(mdRDM(x*(2*y) + a)) | satM40(mdRDM(a − x*(2*y))) |
| off | off | on | on | satM40(mdRDM(x*y)) | satM40(mdRDM(x*y + a)) | satM40(mdRDM(a − x*y)) |
| on | on | on | on | satM40(mdRDM(x*(2*y)))<br>x = y = $2^{18}$:$2^{31}$ − 1 | satM40(mdRDM(x*(2*y) + a))<br>satM40(mdRDM($2^{31}$ − 1 + a)) | satM40(mdRDM(a − x*(2*y)))<br>satM40(mdRDM(a − $2^{31}$ + 1)) |
| off | on | on | on | satM40(mdRDM(x*y)) | satM40(mdRDM(x*y + a)) | satM40(mdRDM(a − x*y)) | mdRDM( ): rounding under control of RDM flag
satM40( ): saturation under control of M40 flag FIG. 13 depicts a simplified block diagram depicting bus interconnections and shadow registers for a dual MAC arrangement in an alternative embodiment of the present invention. In this embodiment, separate shadow registers 1300 and 1302 are provided for each MAC unit. Update control circuitry 1310 provides gated clock signals to each shadow register in response to an associated memory request. Whenever an indirect memory access through the CDP is requested and a redundant coefficient data access is inhibited, as discussed above, update control circuitry 1310 inhibits assertion of a gated clock to the respective shadow register so that the previous data is retained in the respective shadow register 1300, 1302.

Table 6 is an instruction loop that illustrates elimination of redundant operand fetches for 100% of the coefficient accesses. This could be for Echo cancellation in a wireless telephone, for example.

TABLE 6

Instruction Loop Illustrating Elimination
Of Redundant Operand Fetches for 100% Coefficient Accesses

```
localrepeat{
pair (hi (AC0))= *AR2+                  ; ~ (FilterLength/2-1)
| |*AR4+ = pair(hi(AC0))
AC0 += ((*(AR3+DR0)) * coef(*CDP)),     ; ~ (FilterLength/2-1)
AC1 += ((*(AR5+DR0)) * coef(*CPP))
}
```

Table 7 is an instruction loop that illustrates elimination of redundant operand fetches for 50% of the coefficient accesses. This could be for GSM Half Rate calculations in a wireless telephone, for example.

TABLE 7

Instruction Loop Illustrating Elimination
Of Redundant Operand Fetches for 50% Coefficient Accesses

```
localrepeat {                           ;loop i times
AC0 = #K_LPC_ROUND                      ;out[i] = 0800h
| |repeat (#(K_NP-2))                   ;loop j times
AC0 = AC0 + ((*AR5+) * coef(*CDP-)),
AC1 = AC1 + ((*AR4+) * coef(*CDP-))
AC0 = AC0 + ((*AR5-) * coef(*CDP))
```

TABLE 7-continued

Instruction Loop Illustrating Elimination
Of Redundant Operand Fetches for 50% Coefficient Accesses

```
| |mar (*AR4-)                          ;AR4 -> state[j-1]
AC0 = AC0 +((*AR5-) * coef(*CDP))
mar (*AR4-)
*AR5 = *AR2                             ;store the input in the state
| |AC0 = AC0 << #K_ASHIFT               ;buffer
AC0 = AC0 - (DR1 * *AR2+)               ;out[i] = 80000h*Input[i]
*AR7+ = HI (AC0)                        ;store the output in the out
AC1 = AC1 + ((*AR5) * coef(+CDP-))
*AR4 = *AR2
| |AC1 = AC1 << #K_ASHIFT
AC1 = AC1 - (DR1 * *AR2+)               ;out[i+1] = 80000h*
                                        Input[i+1]
*AR7+ = HI (AC1)                        ;store the odd output in the
| |AC1 = DR2                            ;out buffer and reinitialize
}
```

Table 8 is an instruction loop that illustrates elimination of redundant operand fetches for 100% of the coefficient accesses. This could be for GSM enhanced Full Rate calculations in a wireless telephone, for example.

TABLE 8

Instruction Loop Illustrating Elimination
Of Redundant Operand Fetches for 100% Coefficient Accesses

```
localrepeat{
AC1 = *AR2+ * coef(*CDP),               ; L_mult(a[i+1], 8192)
AC2 = *AR2+ * coef(*CDP)                ; L_mult(a[i+1], 8192)
AC2 = AC2 - (*AR3- * coef(*CDP)),       ; x = (a[i+1] - a[M-i]) >> 2
AC1 = AC1 + (*AR3- * coef(*CDP))        ; x = (a[i+1] + a[M-i]) >> 2
DR1 = hi (AC1)
DR2 = hi (AC2)
AC1 = DR1 - *AR4+                       ; AC1 = a[i+1] + a[M-i] - f1[i]
| |DR3 = DR2 + *AR5+                    ; DR3 = a[i+1] - a[M-i] + f1[i]
*AR4 = AC1                              ; f1[i] = a[i+1] + a[M-i] - f1[i]
*AR5 = DR3                              ; f2[i] = a[i+1] - a[M-i] + f1[i]
}
```

Table 9 is an instruction loop that illustrates elimination of redundant operand fetches for 11% of the coefficient accesses. This could be for GSM Full Rate calculations in a wireless telephone, for example.

TABLE 9

Instruction Loop Illustrating Elimination
Of Redundant Operand Fetches for 11% Coefficient Accesses

```
localrepeat{                                    ; cycles : 11 * 20
AC0 = AC0 + (*AR1+ * coef(*CDP+)),              ; AC0 += Wt[k] *
AC1 = AC1 + (*AR2+ * coef(*CDP+))               H[0]
AC0 = AC0 + (*(AR1+DR1) * coef(*CDP+)),         ; AC0 += Wt[k+1] *
                                                H[1]
AC1 = AC1 + (*(AR2+DR1) * coef(*CDP+))          ; AR2 -> AR2+1
                                                (H[2] = 0)
AC0 = AC0 + (*AR1+ * coef(*CDF+)),              ; AC0 += Wt[k+3] *
AC1 = AC1 + (*AR2+ * coef(*CDP+))               H[3]
AC0 = AC0 + (*AR1+ * coef(*CDP+)),              ; AC0 += Wt[k+4] *
AC1 = AC1 + (*AR2+ * coef(*CDP+))               H[4]
AC0 = AC0 + (*AR1+ * coef(*CDP-)),              ; AC0 += Wt[k+5] *
AC1 = AC1 + (*AR2+ * coef(*CDP-))               H[5]
AC0 = AC0 + (*AR1+ * coef(*CDP)),               ; AC0 += Wt[k+6] *
AC1 = AC1 + (*AR2+ * coef(*CDP-))               H[4]
AC0 = AC0 + (*(AR1+DR1) * coef(*CDP-)),         ; AC0 += Wt[k+7] *
                                                H[3]
AC1 = AC1 + (*(AR2+DR1) * coef(*CDP-))          ; AR2 -> AR2+1
                                                (H[2] = 0)
AC0 = AC0 + (*AR1+ * coef(*CDP-)),              ; AC0 += Wt[k+9] *
AC1 = AC1 + (*AR2+ * coef(*CDP-))               H[1]
AC0 = AC0 + (*(AR1 + DR0) * coef(*CDP)),        ; AC0 += Wt[k+10]
AC1 = AC1 + (*(AR2 + DR0) * coef(*CDP))         * H[0]
*(AR1+DR1) = HI (saturate(AC0 << #2))           ; Wt[k] = AC0 * 4
| |AC0 = DR2                                    ; AC0 = 8192
*(AR2+DR1) = HI (saturate(AC1 << #2))           ; Wt[k+1] = AC1 * 4
| |AC1 = DR2                                    ; AC1 = 8192
}
```

Digital System Embodiment

Figure 14A:
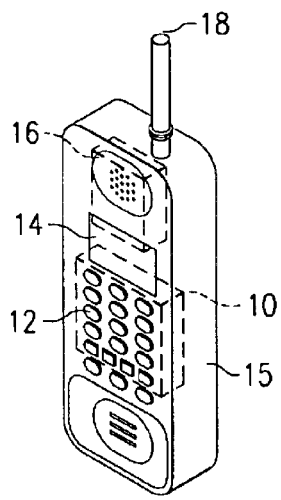
FIG. 14A is a representation of a telecommunications device incorporating an embodiment of the present invention.

FIG. 14A illustrates an exemplary implementation of an example of such an integrated circuit in a mobile telecommunications device, such as a wireless telephone with integrated keyboard 12 and display 14. As shown in FIG. 14, the digital system 10 with processor 100 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Figure 14B:
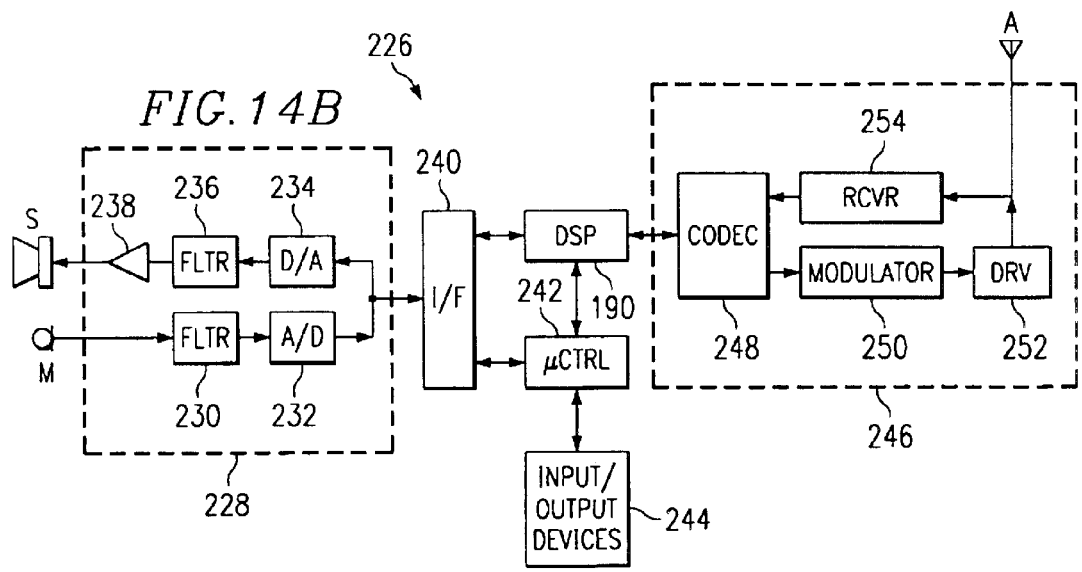
FIG. 14B is a block diagram representation of the telecommunications device of FIG. 14A.

FIG. 14B is a block diagram representation of the telecommunications device of FIG. 14A. Specifically, FIG. 14B illustrates the construction of a wireless communications system, namely a digital cellular telephone handset 200. It is contemplated, of course, that many other types of communications systems and computer systems may also benefit from the present invention, particularly those relying on battery power. Examples of such other computer systems include personal digital assistants (PDAS), portable computers, and the like. As power dissipation is also of concern in desktop and line-powered computer systems and micro-controller applications, particularly from a reliability standpoint, it is also contemplated that the present invention may also provide benefits to such line-powered systems.

Handset 226 includes microphone M for receiving audio input, and speaker S for outputting audible output, in the conventional manner. Microphone M and speaker S are connected to audio interface 228 which, in this example, converts received signals into digital form and vice versa. In this example, audio input received at microphone M is processed by filter 230 and analog-to-digital converter (ADC) 232. On the output side, digital signals are processed by digital-to-analog converter (DAC) 234 and filter 236, with the results applied to amplifier 238 for output at speaker S.

The output of ADC 232 and the input of DAC 234 in audio interface 228 are in communication with digital interface 240. Digital interface 240 is connected to microcontroller 242 and to digital signal processor (DSP) 190. Alternatively, DSP 100 of FIG. 1 could be used in lieu of DSP 190, connected to micro-controller 242 and to digital interface 240 by way of separate buses as in the example of FIG. 6.

Micro-controller 242 controls the general operation of handset 226 in response to input/output devices 244, examples of which include a keypad or keyboard, a user display, and add-on cards such as a SIM card. Micro-controller 242 also manages other functions such as connection, radio resources, power source monitoring, and the like. In this regard, circuitry used in general operation of handset 226, such as voltage regulators, power sources, operational amplifiers, clock and timing circuitry, switches and the like are not illustrated in FIG. 14B for clarity; it is contemplated that those of ordinary skill in the art will readily understand the architecture of handset 226 from this description.

In handset 226, DSP 190 is connected on one side to interface 240 for communication of signals to and from audio interface 228 (and thus microphone M and speaker S), and on another side to radio frequency (RF) circuitry 246, which transmits and receives radio signals via antenna A. Conventional signal processing performed by DSP 190 may include speech coding and decoding, error correction, channel coding and decoding, equalization, demodulation, encryption, voice dialing, echo cancellation, and other similar functions to be performed by handset 190.

RF circuitry 246 bidirectionally communicates signals between antenna A and DSP 190. For transmission, RF circuitry 246 includes codec 248 that codes the digital signals into the appropriate form for application to modulator 250. Modulator 250, in combination with synthesizer circuitry (not shown), generates modulated signals corresponding to the coded digital audio signals; driver 252 amplifies the modulated signals and transmits the same via antenna A. Receipt of signals from antenna A is effected by receiver 254, which applies the received signals to codec 248 for decoding into digital form, application to DSP 190, and eventual communication, via audio interface 228, to speaker S.

Fabrication

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the present invention may include other circuitries that are combined with the circuitries disclosed herein in order to reduce the total gate count of the combined functions. Since those skilled in the art are aware of techniques for gate minimization, the details of such an embodiment will not be described herein.

Thus, there has been described a processor that is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit, and a data computation unit for executing the instructions decoded by the instruction buffer unit. Instructions can be executed in a parallel manner, either in response to implicit parallelism or in response to user defined parallelism.

Advantageously, by tracking coefficient data pointer modification sequences, coefficient fetches from memory are minimized in either a single MAC embodiment or in a dual MAC embodiment in order to reduce power consumption.

Advantageously, redundant memory accesses for a reused coefficient data value are eliminated, thereby preserving memory bandwidth and eliminating memory conflicts and thereby improving processing speed.

Advantageously, the power consumption similar to a register based coefficient operation is provided with increased flexibility.

Advantageously, efficient memory based coefficient multiply operations allow precious CPU registers to be used instead for parallel instructions execution.

Advantageously, a touch instruction "mar(*CDP)" is provided to flag that a coefficient has been updated from a memory write so that the updated coefficient can be fetched for use by the MAC.

Advantageously, an override mechanism is provided to disable the power saving scheme for debug purposes.

Advantageously, coefficient data pointer modification tracking circuitry can be simplified by only tracking pointer modification during looping operations.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. For example, one, two, or more MAC units may be implemented.

In another embodiment, additional tracking circuitry may be provided to monitor the modified status of the CDP at other times than just during a loop or repeated instruction. For example, the CDP may be monitored directly such that a modification resulting from a memory mapped write of the CDP is monitored.

In another embodiment, additional monitoring circuitry may be provided to determine if a memory location pointed to by the CDP is modified by an extraneous memory write cycle so that the CDP tracking circuitry can be notified so that a modified coefficient is fetched, instead of the fetch being inhibited. This could occur in response to a memory write by a peripheral device or a communication channel, for instance.

In another embodiment, tracking circuitry may be provided to inhibit redundant memory accesses for an execution unit other than a MAC unit.

It is therefore contemplated that the appended claims will cover any such modifications of the embodiments as fall within the true scope and spirit of the invention.

What is claimed is:

1. A digital system comprising a microprocessor, wherein the microprocessor comprises:
    an execution unit;
    memory interface circuitry operable to fetch an operand from memory and to provide the operand to the execution unit;
    address pointer circuitry operable to store an address of the operand, and to provide that address to the memory interface circuitry; and
    modification tracking circuitry connected to the address pointer circuitry, the modification tracking circuitry operable to inhibit a redundant fetch of the operand responsive to the contents of the address pointer circuitry not being modified since a previous memory access using the contents of the address pointer circuitry.

2. The digital system of claim 1, further comprising a shadow register for storing the operand from the previous memory access, prior to use by the execution unit.

3. The digital system of claim 1, wherein the address pointer circuitry comprises a coefficient data pointer.

4. The digital system of claim 1, wherein the execution unit is a multiply-accumulate (MAC) unit.

5. The digital system of claim 1, wherein a touch instruction "mar(*CDP)" is provided to flag that the operand has been updated in the memory circuit so that the updated operand can be fetched for use by the execution circuit.

6. The digital system of claim 1, wherein an override mechanism is provided to disable the modification tracking circuitry.

7. The digital system of claim 1, wherein the modification tracking circuitry is operable to only track address pointer modification during looping operations of the microprocessor.

8. The digital system according to claim 1 being a cellular telephone, further comprising:
    an integrated keyboard connected to the processor via a keyboard adapter;
    a display, connected to the processor via a display adapter;
    radio frequency (RF) circuitry connected to the processor, and
    an aerial connected to the RF circuitry.

9. The digital system of claim 1, wherein the address pointer circuitry comprises:
    a pointer register for storing at least a portion of a memory address of the operand;
    wherein the memory interface circuitry fetches operands from memory using the contents of the pointer register for at least a portion of the memory address.

10. The digital system of claim 9, wherein the execution unit comprises a multiply-accumulate (MAC) unit.

11. The digital system of claim 9, wherein the execution unit comprises a plurality of multiply-accumulate (MAC) units.

12. The digital system of claim 1, wherein the execution unit comprises a plurality of multiply-accumulate (MAC) units.

13. A method of operating a digital system comprising a microprocessor, comprising the steps of:
    loading a data pointer with a first address value;
    executing a first instruction in the microprocessor that requires at least a first operand from memory in accordance with the data pointer by fetching the first operand from memory in accordance with the first address value; and
    executing a second instruction in the microprocessor that requires at least a second operand from memory in accordance with the data pointer by inhibiting fetching of the second operand from memory if the data pointer has not been modified since the step of executing the first instruction.

14. The method of claim 13, wherein the step of executing the first instruction comprises loading the first operand into a non-accessible shadow register, such that during the step of executing the second instruction the shadow register is not reloaded if the data pointer has not been modified since the step of executing the first instruction.

15. The method of claim 13, further comprising the step of loading the data pointer with a second address value between the step of executing the first instruction and the step of executing the second instruction; and wherein the step of executing the second instruction comprises fetching the second operand from memory in accordance with the second address value.

16. A digital system comprising a microprocessor, wherein the microprocessor comprises:

an execution unit;

address pointer circuitry, comprising a pointer register for storing at least a portion of a memory address of an operand; operable to provide an address of the operand to the memory interface circuitry;

memory interface circuitry operable to fetch an operand from memory using the contents of the pointer register for at least a portion of the memory address, and operable to provide the operand to the execution unit; and modification tracking circuitry, connected to the address pointer circuitry, is for detecting modifications to the memory address of an operand occurring during the execution of instructions by the execution unit, and for inhibiting a redundant fetch of an operand responsive to the execution unit executing an instruction that uses the fetched operand and that does not modify the memory address of the operand stored in the pointer register.

* * * * *